United States Patent [19]
Ibarolla et al.

[11] Patent Number: 5,800,266
[45] Date of Patent: Sep. 1, 1998

[54] DEVICE FOR THE SUCCESSIVE EXPOSURE OF IMAGES IN AMUSEMENT MACHINES

[75] Inventors: Jesús Echapare Ibarolla; José Luis Pina Insausti, both of Pamplona, Spain

[73] Assignee: Azkoyen Industrial, S.A., Peralta, Spain

[21] Appl. No.: 667,551

[22] Filed: Jun. 21, 1996

[30] Foreign Application Priority Data

Jun. 23, 1995 [ES] Spain ............................ 9501263

[51] Int. Cl.⁶ .................................................. A63F 9/00

[52] U.S. Cl. .................................................. 463/34

[58] Field of Search .......................... 463/30, 31, 32, 463/33, 34; 352/124, 157, 158, 159

[56] References Cited

U.S. PATENT DOCUMENTS

| | | | |
|---|---|---|---|
| 3,645,531 | 2/1972 | Wright | 463/34 |
| 3,707,326 | 12/1972 | Kadowaki | 352/124 |
| 4,146,313 | 3/1979 | Feltz et al. | 352/157 |
| 4,322,080 | 3/1982 | Pennington | 463/34 |

*Primary Examiner*—George Manuel
*Attorney, Agent, or Firm*—Rothwell, Figg, Ernst & Kurz

[57] ABSTRACT

Device for the successive exposure of images in amusement machines, made up of a structure (1) that supports two consecutive synchronized dragging rollers (3 and 4), at least two consecutive fixed position guiding rollers (5 and 6) and two non consecutive, removable, adjustable position guiding rollers (7 and 8), upon which rollers is mounted a flexible continuous strip (22), bearing images that pass in front of a viewing window, near which are fitted lighting means (23), including furthermore means (30, 31, 32, 35) used to control the position of the images.

10 Claims, 5 Drawing Sheets

DEVICE FOR THE SUCCESSIVE EXPOSURE OF IMAGES IN AMUSEMENT MACHINES

BACKGROUND OF THE INVENTION

The present invention refers to a device for the successive exposure of images in amusement machines and, more specifically, to a device in which the images are located upon a supporting device that has the form of a flexible continuous image strip.

Devices for the successive exposure of images in amusement machines are already known, made up of a flexible continuous strip mounted upon a number of rollers and which carries motifs or images that become visible, from the outside of the amusement machine, whenever the image strip passes by a track in which there is a viewing window.

Devices of the described type have already been described in Spanish patents number 492,010; 498,490 and 505,262, as well as in British patent number 206,8620. In all of the above cases the devices include a dragging device, connected to an actuation motor and one or more guiding rollers, free spinning, wherein all of the rollers are fixedly attached to the frame or structure in which they are mounted. The dragging roller is fitted with tooth that mesh into holes practised in the flexible image strip. The previously cited patents provide for the arrangement of lighting means near the viewing window, as well as means to determine or identify the position of the image strip, in order to control its walls ensuring a proper positioning of the images on the viewing window.

Spanish utility models number 9100716 and 9100717 also describe devices that feature the previously described constitution, which include a box or housing in which the various components are assembled. In the British patent number 2.150.335 the box or housing is made up of independent walls or panels, removable, including two walls that are perpendicular to the axis of the rollers on which the image strip is mounted. The internal surface of these walls have two channels or slots arranged in confrontation to each other so as to receive the edges of the image strip.

Finally, European patent application number 629,980A describes a device that includes a continuous strip that is dragged by a motor and that passes in front of a viewing window. This device includes, as means to support and guide the image strip, two parallel plates that, with the aid of intermediate spacers, constitute the frame of the device. Those plates have on their internal surface corresponding slots arranged in confrontation to each other so as to receive the edges of the image strip.

In all of the previously mentioned patents, the position of the various rollers upon which the image strip is assembled is fixed, so that the image strip assembly and dismantling operations may be cumbersome.

This problem may be solved by sizing the length of the image strip so that it stays somewhat loose when assembling the rollers, which may cause adjustment problems in respect of the positioning of the motifs in front of the viewing window.

British patent number 2.150.335 describes a floating guiding roller, which makes the constitution of the device more complex and presents the added risk that the image strip may accidentally come off. This problem is solved by guiding the edges of the image strip between channels or slots practised into the corresponding walls of the frame or housing. In European application number 629,980A the walls of the housing, between which the image strip is mounted, are removable, freeing the spacers of the walls and the image strip.

On the other hand, due to the fact that the device incorporates a single image strip dragging roller, it is then not possible to secure and keep constant the pulling force and length of the image strip on the track that runs in front of the viewing window, which may lead to errors or deviations in respect of the precise positioning of the motifs in front of the viewing window.

The devices already known normally use a motor of the type known as "step by step", which turning speed is determined through the creation of a series of electrical impulses that determine the turning angle of the motor, to drag the image strip. This type of motor usually has low torque characteristics, which means that the motor might not turn at the previously established angle whenever a friction or adjustment problem occurs, which causes an incorrect positioning of the images of the image strip in front of the viewing window. Back and forth image strip motion undetected by the system may also take place.

SUMMARY OF THE INVENTION

The object of this invention is a device for the successive exposure of images in amusement machines of the type previously described, in which the image strip may be easily disassembled and removed, using a fast anchorage system that does not require tools nor makes it necessary to disassemble the structure or frame, making it then possible to clean or replace the image strip very quickly.

Another object of the invention is to achieve a device in which it is possible to keep constant the pulling force and length of the section of image strip that runs in front or the viewing window, thus ensuring the proper positioning of the motifs in front of the viewing window, avoiding at the same time that the image strip may rub and cause friction against the lie or profile of the running track that includes the viewing window.

A further object of the invention is to achieve a device in which the image strip may follow, in front of the viewing window, a trajectory that is totally straight or that features a given lengthwise curvature.

It is also an object of the invention to give the exposure device with image strip control means capable of detecting the displacements of the image strip and of ensuring the proper positioning of the images in front of the viewing window.

In accordance with this invention, the set of roller on which the image strip is mounted includes two consecutive synchronized dragging rollers, at least two consecutive fixed position guiding rollers, and two non consecutive guiding rollers, removable and featuring adjustable position. Each of the two consecutive synchronized dragging rollers is mounted at each end of the portion of circuit in which the viewing window is located.

This arrangement ensures the pulling force and length of the image strip portion running between the two consecutive dragging rollers, between which the viewing window is located, thus ensuring the positioning of the motifs before the viewing window, and this without the need to fit image strip tensing elements to the device.

By changing the length of the image strip portion running between the two consecutive synchronized dragging rollers, it is possible to make this portion run as per a straight or curved trajectory, making it possible to fit, on the inside of the image strip, an interchangeable support that carries the lighting means and which may feature a flat or curved-convex external surface, so as to be able to adapt to the configuration of the viewing window.

The non consecutive rollers of the guide are located between the consecutive dragging rollers and the consecutive guiding rollers, displaced towards the inside of the frame in respect of the adjacent dragging and guiding rollers, causing the image strip to form two adjustable depth loops. Each one of these rollers is mounted between two elastically deformable parallel straps or ribbons, fixed to the structure or frame at one of their ends and fitted with at least two holes axially distanced from each other, and located on opposite positions on the two straps or ribbons. The axis of the rollers shall be mounted between the internally or externally confronted holes depending upon the trajectory to be followed by the band along the portion in which the viewing window is located.

The above described non-consecutive guiding roller assembly system does also allow the removal of the image strip in a simple and quick manner. Flexing outwards the straps or ribbons between which the rollers are assembled is all that is needed, in order to free and extract them, after which the image strip shall be loose enough to allow its extraction, so that it may be cleaned up or replaced by a new image strip.

According to another characteristic of the invention, the control of the image strip is based on the use of detectors that produce a set of impulses generated as per the "GRAY" code, which allows the position of the images of the image strip to be encoded.

Through the use of this system it is possible to know at all times the turning angles of the motor, independently of the problems that there may be in respect of friction rubbing or misalignments, and therefore also the turning direction of the image strip and also the precise position of the band, whether it is moving or at rest, taking actions as needed through the corresponding microprocessor.

BRIEF DESCRIPTION OF THE DRAWINGS

The features and benefits set out may be understood better by reading the following description, made with reference to the attached drawings, which schematically show an example of execution. In the drawings.

DETAILED DESCRIPTION OF THE INVENTION

Figure 2:
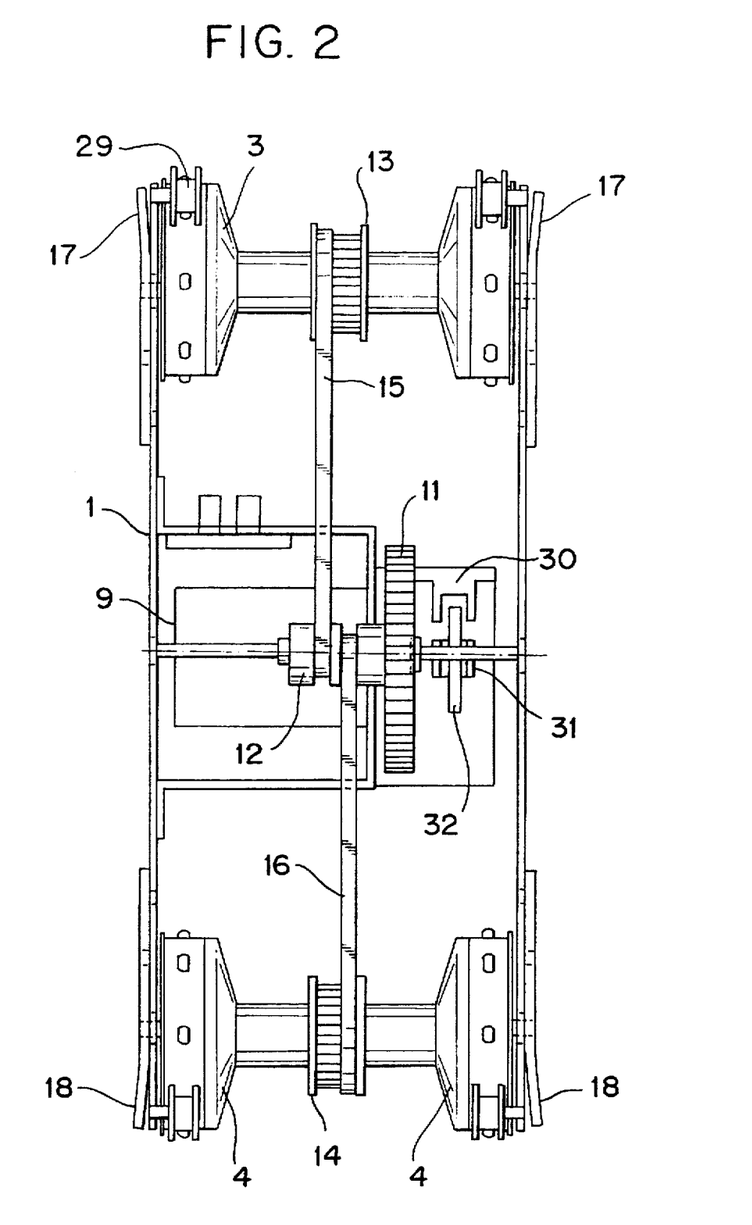
FIG. 2 is a frontal elevation view of the device, as per direction A of FIG. 1, without the flexible image strip and without the lighting means supporting elements.

As may be observed in FIG. 2, the device object of the invention includes a frame or housing made up of two parallel plates or walls, marked with reference numbers 1 and 2, joined to each other through intermediate rods or connectors not shown.

Figure 1:
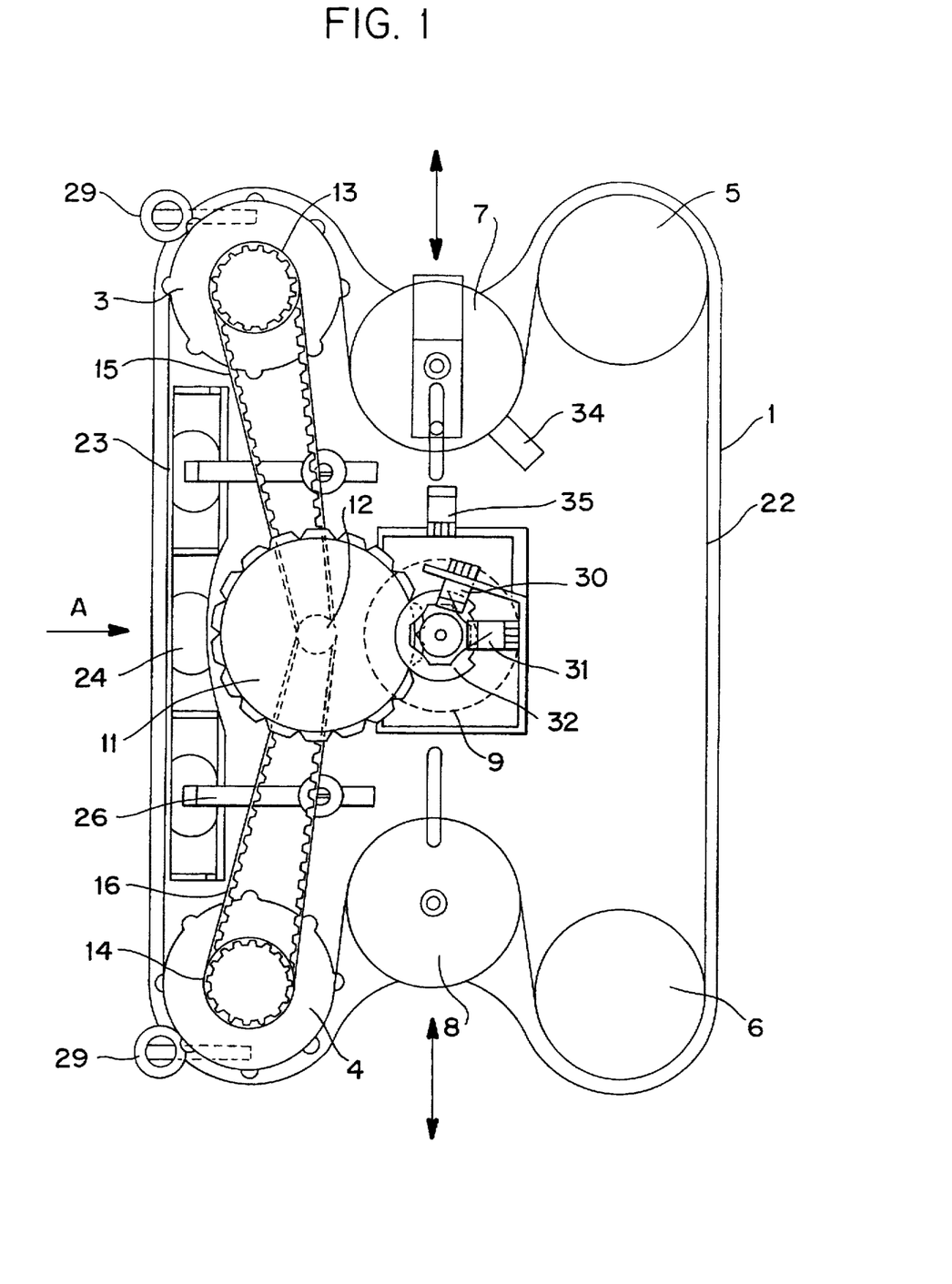
FIG. 1 is a side elevation view of a device made in accordance with the invention, in which the frontal wall of the frame or housing has been removed.

Between plates 1 and 2 are mounted two consecutive dragging rollers, marked with reference numbers 3 and 4, two consecutive free turning rollers, marked with reference numbers 5 and 6 and two non consecutive free turning rollers, marked with reference numbers 7 and 8, as shown in FIG. 1.

On the frame or housing is also assembled an electric micromotor 9 which outlet axis incorporates a pinion 10 on which meshes a toothed crown wheel 11 on which axis is fitted a toothed pulley 12, as shown in FIG. 1. Dragging rollers 3 and 4 do each have on their axis a toothed pulley 13 and 14.

Between each toothed pulley 12 of crown wheel 11 and the toothed pulleys 13 and 14 of rollers 3 and 4 are mounted toothed chains 15 and 16, defining on the whole a mechanical transmission system that ensures the proper synchronism of rollers 3 and 4.

Figure 4:
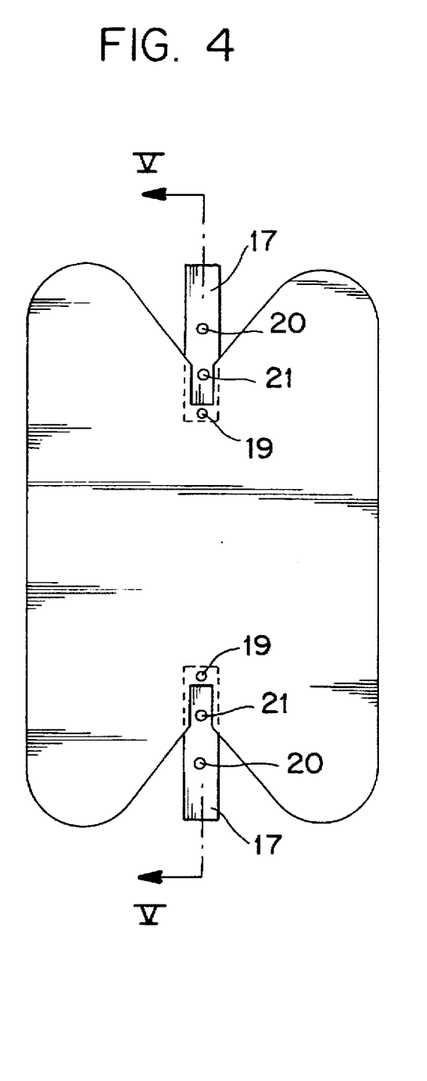
FIG. 4 is an internal elevation of one of the side walls that made up the frame or housing of the device object of the invention.
Figure 5:
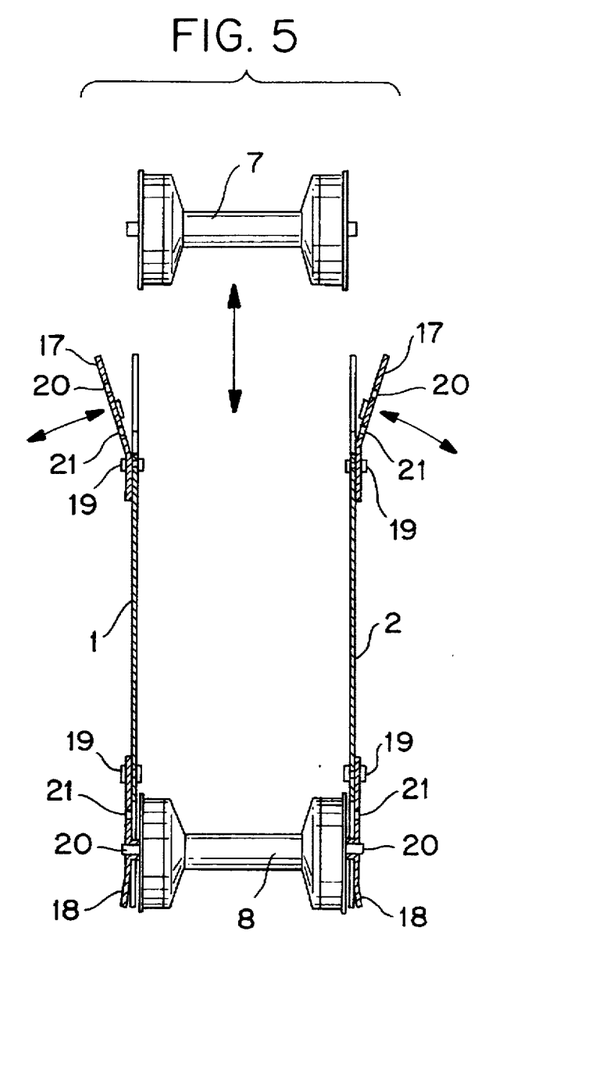
FIG. 5 is a schematic section of the frame, taken as per the cutting lines V—V of FIG. 4.

The non consecutive free turning rollers 7 and 8 are assembled, as may be better observed in FIGS. 4 and 5, upon parallel straps or ribbons 17 and 18, of an elastically deformable nature, that can be made of plastic material. Each one of these straps is attached to wall 1 or 2 of the structure or frame by one of their ends, for instance using a rivet, screw, or similar fixing element 19, being possible to flex the straps or ribbons outwards from their anchorage point, just as the straps or ribbons 17 are shown in FIG. 5. Each one of the straps or ribbons 17 and 18 has at least two holes 20 and 21, axially distanced from each other and practised in confronting positions in the two straps or ribbons of each side. Between the internal 21 or external 20 holes of the straps 17 and 18 are assembled the free turning rollers 5 and 6.

By flexing the straps or ribbons outward, as may be observed in respect of straps 17 in FIG. 5, the corresponding roller may then be freed and removed from the frame or housing.

Employing the above constitution, a flexible image strip 22 is then assembled upon the described set of rollers which forms two loops around rollers 7 and 8 directed towards the inside of the frame.

Because the two dragging rollers 3 and 4 are synchronized to each other, the portion of the image strip 22 that runs between these two rollers shall feature constant pulling pressure and length which may therefore be modified depending on whether rollers 7 and 8 are fitted to the internal holes 21 of the flexible straps, FIGS. 4 and 5, or else to their external holes 20.

Whenever rollers 5 and 6 are fitted to the internal holes 21, the image strip 22 follows a straight trajectory between dragging rollers 3 and 4. On the other hand, whenever the rollers 7 and 8 are fitted into the external holes 20 of the flexible straps 17 and 18, the portion of strip that runs between rollers 3 and 4 follows a curved-convex trajectory, as shown in FIG. 3.

In the first case, a supporting element 23 that carries the lighting means 24 and which features a flat external surface directed towards the image strip 22 is fitted onto the frame, inside the portion of image strip that runs between dragging rollers 3 and 4.

Figure 3:
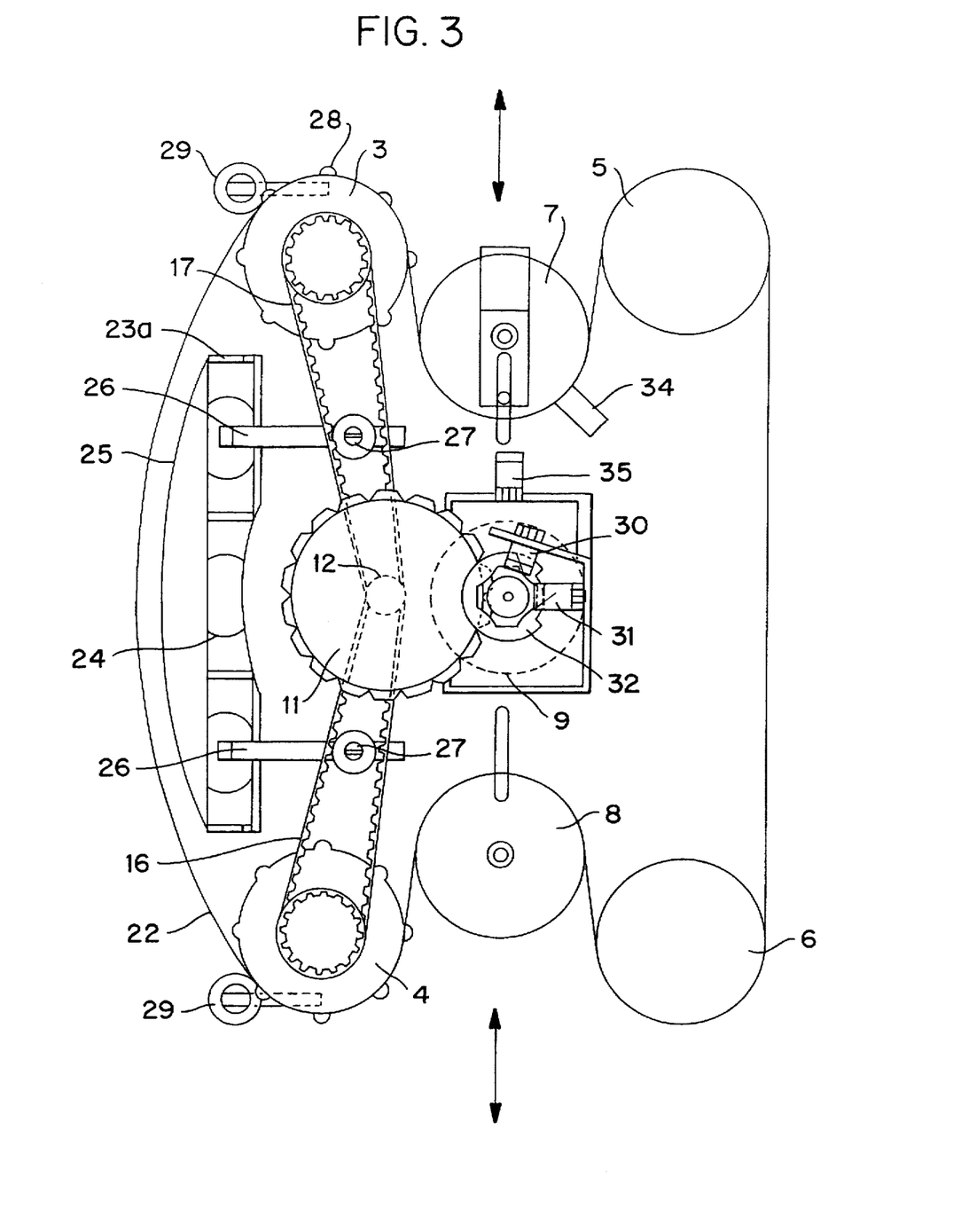
FIG. 3 is a view similar to that of FIG. 1, where the image strip follows a curve-convex trajectory through the portion that runs in front of the viewing window.

In the second case, as may be observed in FIG. 3, a supporting element 23a featuring a curved-convex external surface 25 directed towards image strip 22 is fitted within the portion of the image strip 22 that runs between rollers 3 and 4.

The control of the position of image strip 22 is based on the application of the "GRAY" code, which is a position encoding method that may be implemented using two or more detectors; so that the number of detectors will determine the number of different positions that may be discriminated, in accordance with the expression:

$$N=2^n,$$

where N is the number of positions and n is the number of detectors.

In any position each one of the detectors may only be in one of two different states, which we shall call "state 1" and "state 0". Only one of the detectors changes state in the passage from a position to another, this being the main feature of the "GRAY" code.

In a physical state of motion incorporating the "GRAY" code, we may determine the position in which we are at any given time and the direction of movement if we continuously observe the state of the detectors.

In the example represented in the drawings, the device includes two detectors 30 and 31 made up of as many phototransistors, and a disk 32 joined to the axis of motor 9. With this arrangement, the application of the "GRAY" code is now explained with reference to FIGS. 6 to 9.

As may be observed in these figures, disc 32 has, at its periphery, an inlet or gap 33 which angular amplitude is 180°. During the turning motion of the motor, disc 32 shall intercept and allow the passage of the beam issuing from each phototransistor. Whenever the phototransistors are saturated, which corresponds to the position of the disc in which it allows the passage of the beam, we then say that its signal is "0", whenever the disc intercepts the beam the phototransistor is not saturated and we then say that its signal is "1".

Figure 6:
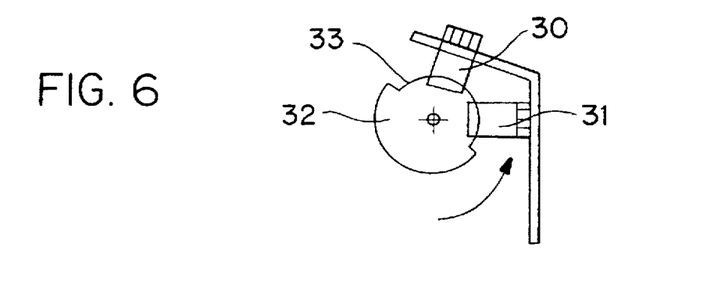
FIGS. 6 to 9 represent successive positions of the image strip control means.
Figure 7:
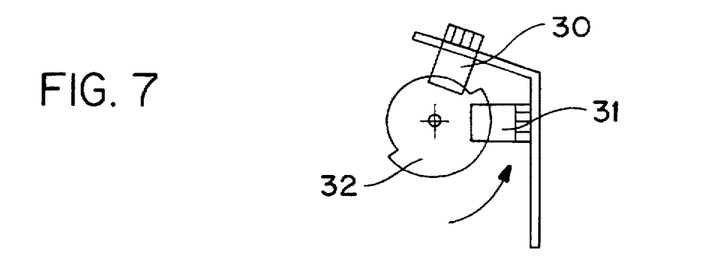
Figure 8:
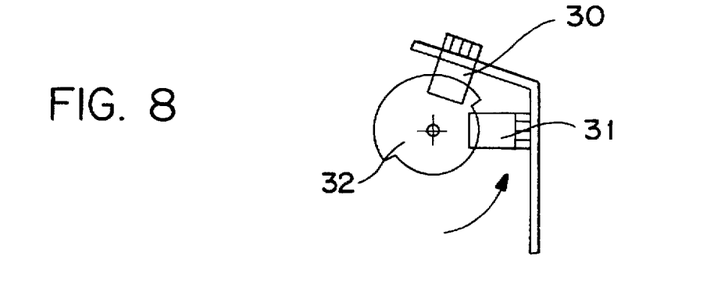
Figure 9:
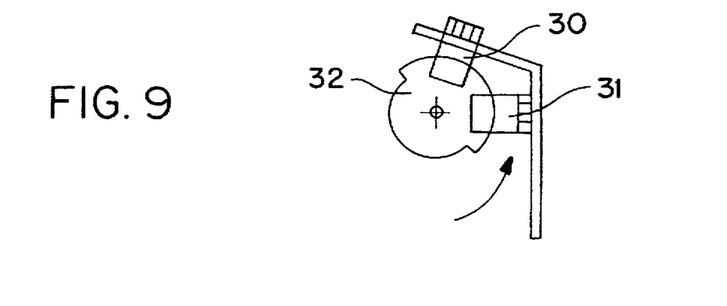

Starting from the position shown in FIG. 6, in which disc 32 allows the passage of the beam of the two sensors 30 and 31, as the disc turns it shall traverse the positions shown in FIGS. 7, 8 and 9, causing the production of signals that, due to the physical shape of the disc and the positioning of sensors 30 and 31, cause the code to change one of the two signals in respect of each 90° of turn of the motor. From FIG. 6 to FIG. 9 the value of the signals of the sensors shall respectively be as follows: 0-0; 0-1; 1-0; and 1-1.

As may be observed, a detector changes its state in the passage from one figure to the next one.

The passage from one position to another may be ascendent (motion in a direction), FIGS. 6, 7, 8, 9, 6, 7, 8 . . . , descendent (motion in the opposite direction), FIGS. 6, 9, 8, 7, 6, 9, 8, 7, . . . .

The system described may be used in different manners, depending upon the control to establish in respect of the image strip.

The device does furthermore include a tab 34 that is attached to image strip 22, and which passage may be controlled by using a magnetic, capacitive, optical, etc. detector 35, and which may be used as an end of image strip indicator.

In short, using the previously described arrangement it is possible to manufacture a device in which the existence of two synchronized dragging rollers ensure the correct positioning of the portion of image strip that runs in front of the viewing window, whichever may be the trajectory to be followed by that portion. On the other hand, the image strip may also be simply and quickly assembled and disassembled. Furthermore, the portion of the image strip that runs in front of the viewing window may do so following a straight or curve trajectory, without modifying the position of the device.

We claim:

1. A device for the successive exposure of images in amusement machines comprising:
   a frame which supports a number of dragging and guiding rollers upon which is mounted a continuous flexible strip having multiple images thereon, said strip passing in front of a viewing window and wherein an image strip lighting device is mounted near said viewing window; and
   position control device which controls the position of said strip in front of said viewing window, said position control device comprising,
   (a) two consecutive synchronized dragging rollers mounted on said frame, one dragging roller positioned so that it contacts the strip above the viewing window and the other dragging roller positioned so that it contacts the strip below the viewing window;
   (b) at least two consecutive fixedly arranged guiding rollers, and
   (c) two non-consecutive, adjustable position, removable guiding rollers positioned between said consecutive dragging rollers and said consecutive guiding rollers, said non-consecutive guiding rollers being displaced inwards in the frame with respect to said consecutive dragging rollers and said consecutive guiding rollers thereby permitting said strip to form two adjustable depth loops.

2. The device in accordance with claim 1, wherein one of the non-consecutive guiding rollers is fitted between two parallel, elastically deformable straps, said straps being attached to said frame by one of its ends and having at least two axially distanced holes, said holes in said strap are positioned to receive the axis of the corresponding non-consecutive removable guiding roller.

3. The device according to claim 2, wherein each selectable position determines a different distance of displacement of said strip.

4. The device in accordance with claim 1, further comprising an interchangeable support element which supports said image strip lighting means and which has an external surface that substantially describes the trajectory of the portion of the strip in front of said viewing window.

5. The device in accordance with claim 4, wherein said external surface of said support element has a straight surface.

6. The device in accordance with claim 4, wherein said external surface of said support element has a curved surface.

7. The device in accordance with claim 1, wherein said position control device further comprises at least two sensors for detecting the turns of a disc attached to an axis of a motor which drives the image strip around the circuit, wherein said sensors produce a set of impulses according to a Gray code used to encode image positions.

8. The device in accordance with claim 7 wherein said sensors comprise photo transistors wherein the light beams from said photo transistors may either pass or be intercepted by the disc as the disc turns.

9. The device according to claim 7, wherein said position control means further comprises a third sensor for detecting the passage of a tab attached to said strip, which indicates the beginning or the end of said strip.

10. A device for the successive exposure of images in amusement machines having a frame which supports a number of dragging and guiding rollers upon which is mounted a continuous flexible strip having multiple images thereon and wherein the strip passes in front of a viewing window, said device comprising:

(a) two consecutive synchronized dragging rollers mounted on said frame, one dragging roller positioned so that it contacts the strip above the viewing window and the other dragging roller positioned so that it contacts the strip below the viewing window;

(b) at least two consecutive fixedly arranged guiding rollers; and (c) at least two non-consecutive, adjustable position, removable guiding rollers positioned between said consecutive dragging rollers and said consecutive guiding rollers, said non-consecutive guiding rollers being displaced inwards in the frame with respect to said consecutive dragging rollers and said consecutive guiding rollers thereby permitting said strip to form multiple adjustable depth loops.

* * * * *

UNITED STATES PATENT AND TRADEMARK OFFICE
CERTIFICATE OF CORRECTION

PATENT NO. : 5,800,266
DATED : September 1, 1998
INVENTOR(S) : Jesus Echapare Ibarrola; Jose Pina Insausti It is certified that error appears in the above-indentified patent and that said Letters Patent is hereby corrected as shown below:

On the title page, item [75]:
First line of inventors' change "Ibarolla" to --Ibarrola-- line 24, column 1, change "tooth" to --teeth--;

line 33, column 2, change "in front or the" to --in front of the-- line 49, column 2, change "roller" to --rollers--;

line 53, column 2, change "position" to --positioning--;

line 4, column 3, change "non consecutive" to --non-consecutive--;

Signed and Sealed this

Twenty-sixth Day of January, 1999

Attest:

*Attesting Officer*

*Acting Commissioner of Patents and Trademarks*